July 10, 1934.  C. C. PALMER  1,966,357
POWER TRANSMISSION DEVICE
Filed Dec. 20, 1933    3 Sheets-Sheet 1

Inventor:
Charles Clyde Palmer,
By Spear, Davidson & Hull
Attorneys.

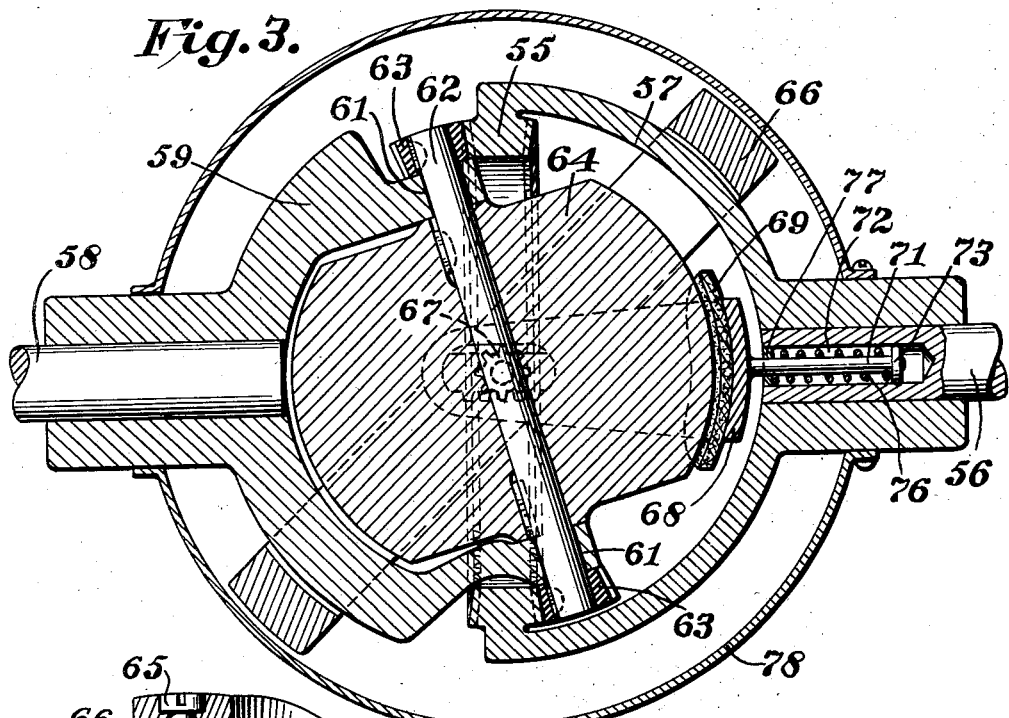
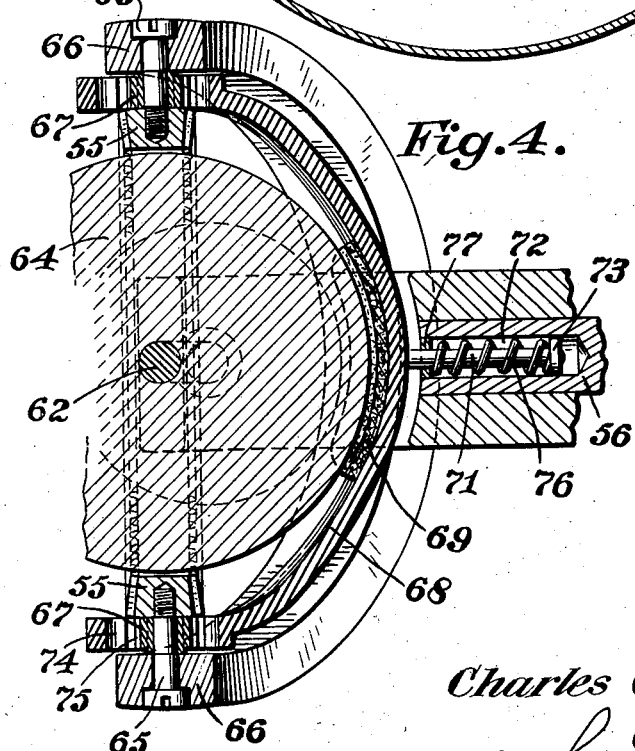
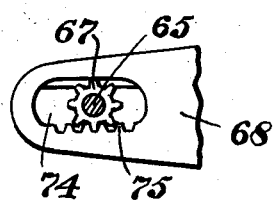

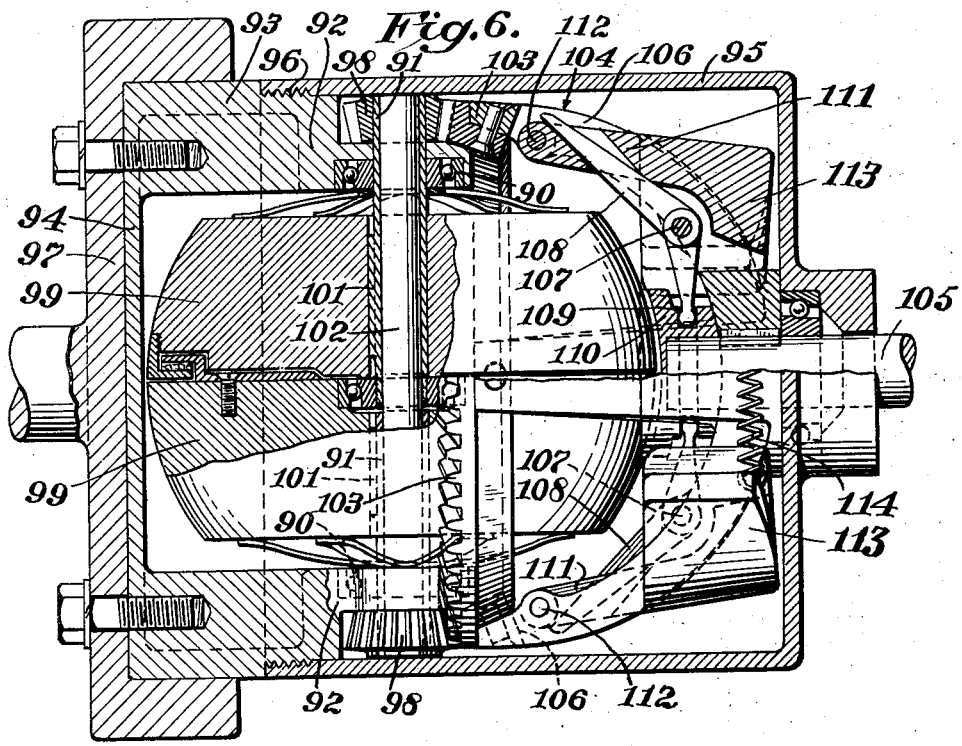
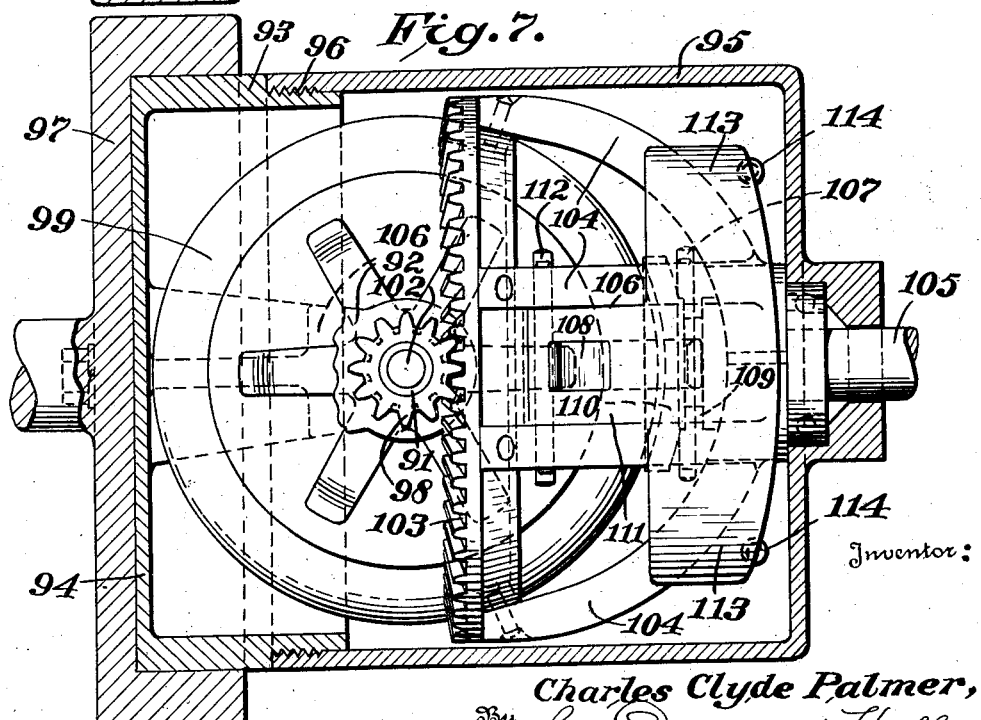

Patented July 10, 1934

1,966,357

UNITED STATES PATENT OFFICE 1,966,357

POWER TRANSMISSION DEVICE

Charles Clyde Palmer, Waupaca, Wis.

Application December 20, 1933, Serial No. 703,305

21 Claims. (Cl. 74—259)

This invention relates to power transmitting devices and more particularly to a speed change mechanism for coupling a driving and a driven shaft to bring them to a uniform rotational speed, and is in part a continuation of my application Ser. No. 648,303, filed Dec. 21, 1932, and my application Ser. No. 678,516 filed June 30, 1933.

An object of the device of this invention is to provide a means for starting a driven shaft under load and effecting rapid acceleration of that shaft until the speed of the driving shaft has been attained.

Another object is the provision of a speed change device which provides an infinite number of gear ratios depending on the load on the driven shaft and the speed at which the driving shaft is rotated.

A further object of the device is to provide a speed change device which will effect a gradual increase in speed of the driven shaft to that of the driving shaft, without the necessity of manual manipulation.

This device could advantageously be used in automobiles to eliminate the transmission, as it provides for the most rapid acceleration possible. It thus would dispense with the process of shifting gears.

Generally stated, the invention contemplates the combination of a gyroscopic element with an epicyclic gear train to utilize the operative characteristics of the gyroscope in acting upon one of the rotating gears. It is to be expressly understood, however, that the invention is not limited to toothed gears and it is intended that wherever the word "gear" is used in the following description and in the appended claims, it is to be understood as including wheels, or like surfaces, having a rolling contact.

Further, the invention contemplates the provision of two distinct frictional resistance elements in the device formed by the above combination, to retard the relative rotation of the gyroscopic element. One such frictional resistance element is operative upon an increase in the angular velocity of the driving shaft, and the other is operative upon an increase in the angular velocity of the driven shaft. The first frictional resistance element assists in starting the load, while the other effects automatic acceleration of the driven shaft and maintains a high-gear ratio of the device although the driving shaft speed may have been decreased.

Fig. 3 is an elevation of a modified form of the invention partly in section.

Fig. 4 is a detail plan view of the brake mechanism.

Fig. 5 is a fragmentary elevation of Fig. 4.

Fig. 6 is an elevation partly in section, of another modification of the invention.

Fig. 7 is a plan of Fig. 6, part of the casing being broken away.

Figure 1:
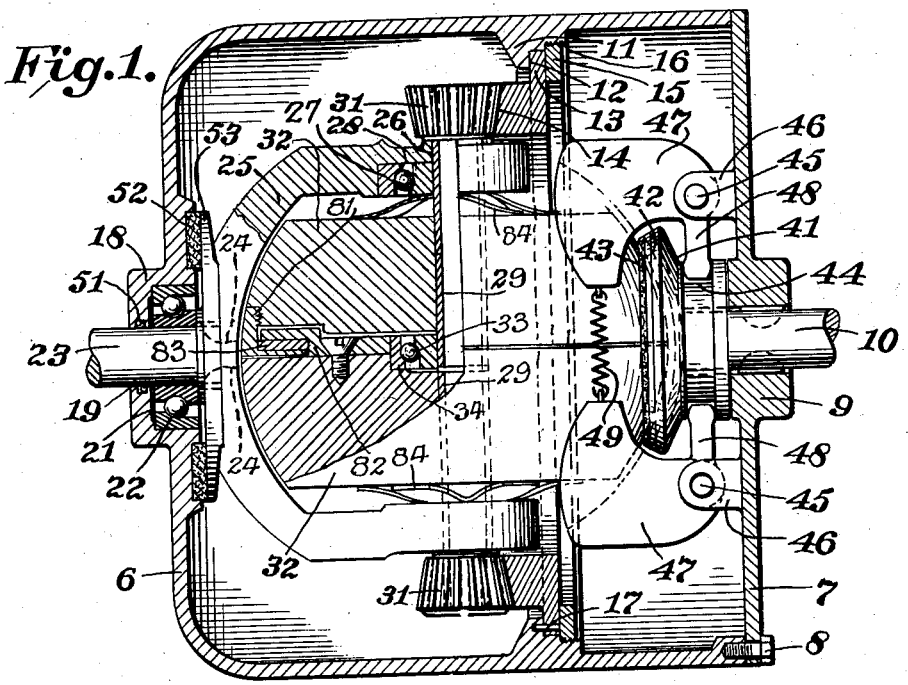
Fig. 1 is an elevation of one embodiment of the invention partly in section.

Referring particularly to Fig. 1, the casing of the device comprises the shell 6, preferably of cylindrical shape, and the end plate 7 secured to its open end as by bolts 8. The center of the end plate 7 is enlarged to form a hub 9 within which is keyed, or otherwise affixed, a driven shaft 10. This shaft projects within the casing a short distance for a purpose to be hereinafter described.

The interior of the side wall of the shell 6 is provided with an annular flange 11 providing a shoulder at 12 against which the peripheral flange 13 of a ring gear 14 is confined by a retaining ring 15 threadibly engaged with the shell at 16. To prevent rotation of the ring gear relative to the shell, one or more pins 17 may be provided. In the embodiment shown, it is important that the plane of the ring gear be perpendicular to the axis of the driven shaft.

The wall of the shell 6 opposite from the end plate 7 has a central enlarged portion forming a hub 18 which is bored at 19 in axial alignment with the driven shaft. This hub is further recessed at 21 to receive a bearing 22 preferably of the ball bearing type. The inner race of the bearing 22 receives a driving shaft 23 which projects a short distance within the casing.

Secured to the inner end of the driving shaft, as by keys 24, is a yoked supporting member 25. The ends of the arms of this yoke are apertured as at 26, and these apertures are in axial alignment. In the particular embodiment of the invention shown in Figs. 1 and 2, the axis of these apertures is at right angles to the axis of the driving and driven shafts. It will be understood, however, that the device is not limited to this arrangement, but that it will be operative for all positions of the axis of the apertures 26 when non-coincident with the axis of the driven and driving shafts. The arrangement in which these axes are perpendicular is preferred.

For the reception of bearings 27, the inner faces of the arms of the yoke 25 are recessed as at 28. Positioned within the inner face of each bearing 27 are hollow shafts or connecting sleeves 29, the inner ends of which extend nearly to the axis of the driving shaft, and the outer ends of which project beyond the arms of the yoke 25. Affixed in any suitable manner to the outer end of each sleeve is a pinion gear 31 meshing with the ring gear 14. It will be apparent that with the arrangement shown the pinion gears 31 will cooperate with the ring gear at diametrically opposite points.

Secured to the inner end of each sleeve 29 are fly-wheels or gyroscopic elements 32. These gyroscopic elements are on opposite sides of the axis of the driven shaft and are spaced by a bearing 33 located in a recess 34 in one of the gyroscopic elements and surrounding the sleeve 29. This provision of a gyroscopic element and the utilization of its operative characteristics is an important feature of this invention.

A feature of this invention is the provision of brake means between the opposed faces of the gyroscopic element. These opposed faces carry interlocking concentrically located ring members 81 and 82 each of which is secured to one of the gyroscopic elements 32 in any suitable manner for example as shown. Between the interlocking flanges of these ring members is located the friction material 83.

To urge the gyroscopic elements toward each other and to take up the thrust set up by centrifugal force when the yoke 25 is rotated a spring washer 84 is interposed between each gyroscopic element and its bearing 27. These spring washers are of concave shape and are provided with a plurality of radially disposed spring fingers pressing against the gyroscopic elements. When the driving shaft has attained a predetermined angular velocity the tendency of the gyroscopic elements to separate under the action of centrifugal force, will exceed the resistance offered by the spring washers 84 and the friction material will be placed under compressive stress to retard the spinning of the gyroscopic elements. The result of this action is to produce by a combination of gyroscopic and frictional resistance the same result which would be accomplished by gyroscopic resistance alone at a higher speed.

As has been stated, the driven shaft projects within the casing. Longitudinally slidable upon this projecting end is a brake shoe 41 having an enlarged concaved end 42 preferably faced with friction material 43. This concaved surface should have the same radius of curvature as the outer surface of the gyroscopic elements. The brake shoe is also formed with an annular shipper groove 44.

Pivoted by pins 45 to lugs 46, secured to the end plate 7 on opposite sides of the driven shaft, are a pair of governor weights 47. As here shown, these weights are elongated to substantially the diametrical width of the gyroscopic elements and conform to their outer surfaces. Formed integrally with the weights are actuating arms 48 which engage within the shipper groove 44. The weights and arms form, in effect, bell crank levers, and it will be apparent that, upon outward movement of the governor weights under the influence of centrifugal force when the driven shaft is rotated, the actuating arms will force the brake shoe 41 into engagement with gyroscopic elements. To urge the weights toward each other and normally maintain the brake in released position, a pair of springs 49 may be disposed between the extreme ends of the weights.

The casing maintains the driven and driving shafts in axial alignment for the proper operation of the device and also serves to confine a lubricant for the contacting surfaces of the device. To prevent discharge of the lubricant past the driving shaft, packing 51 may be confined within a recess in hub 18, and a packing material 52 may be disposed between the end wall adjacent the hub 18 and a flange 53 formed on the yoke 25.

In the operation of the device, when the driving shaft is rotated, assuming the ring gear and the driven shaft to be standing still, two separate and distinct motions of the gyroscopic elements are produced. These are, (1) the angular rotation of the gyroscopic elements about the axis of the driving shaft in a plane perpendicular to the driving shaft, and (2) the spinning of the gyroscopic elements on their own axes which, being that of the pinion shaft, is perpendicular to the axis of the driving shaft. The angular rotation is equal to the speed of the driving shaft since the yoke carrying the gyroscopic shaft is affixed to the driving shaft and rotates with it. The spinning motion is caused by the orbital movement of the pinion gears about the ring gear while meshing with it. The pinion gears are thus given a rotation relative to the yoke, in addition to their angular motion, and this relative rotation is imparted to the gyroscopic elements.

The spinning motion is entirely dependent upon the difference in speed between the driving and driven members. If the driven shaft is standing still, each gyroscopic element will turn on its own axis at a speed in proportion to the gear ratio between the ring gear and each pinion gear, but as the driven shaft carrying the ring gear begins to turn, the spinning motion is reduced. If the driven shaft is turning one half as fast as the driving shaft, each gyroscopic element will have a relative rotational speed half as fast as it had when the driven shaft was still. When the speed of the driven shaft has reached that of the driving shaft, the spinning motion of each gyroscopic element will have ceased entirely, only the angular rotation continuing. The speed of each gyroscopic element varies directly as the ratio between the speeds of the driving and driven shafts.

The two movements of each gyroscopic element, i. e., its spinning movement and its angular movement, resist each other, and the higher the speed the greater will be the resistance. Retardation in either of these movements will relieve the resistance. Since the angular motion is maintained by the power applied to the driving shaft, this retardation must be accomplished in the spinning motion of each gyroscopic element. The force thus developed is applied equally to the driving and driven shafts. Retardation in the driving shaft or acceleration in the driven shaft will, either one, relieve this resistance, and, since the driving shaft is not permitted to retard, the driven shaft must finally succumb to this force and begin to rotate.

This operation of the device follows the law of kinetics, that there cannot be any action without a corresponding resultant reaction. The power applied to the spinning of each gyroscopic element reacts against the angular rotation, and the power applied to the angular rotation reacts against the spinning of each gyroscopic element in exactly the same way. All the power absorbed in the angular rotation—with each gyroscopic element spinning—reacts directly against the spinning of the gyroscopic element. These two movements react against one another and place themselves in a state of perfect balance at all times. The resistance which each spinning gyroscopic element offers to the angular rotation is measured in the spinning motion which produces it. The angular rotation offers exactly the same resistance to the spinning motion as the spinning motion offers to the angular rotation. As has been stated, this gyroscopic resistance reacts directly against the ring gear, mounted on the driven shaft and induces rotation in this member, which relieves the resistance thus set up.

As the ring gear 14 begins to rotate, the spinning motion or relative rotation of the gyroscopic elements is lessened, but the angular rotation continues. Thus, when the driven shaft has attained a certain speed where the resistance of the gyroscopic action exactly balances the load applied to the driven shaft, the speed ratio of the two shafts would remain constant at that point except for the action of the governor weights 47, which tend to swing outward as soon as the driven shaft begins to rotate. The brake shoe 41 is thereby moved into contact with the gyroscopic elements and further retards their spinning action. This pressure is increased as the speed of the driven shaft increases and this produces automatic acceleration in the driven shaft until the speed of the driving shaft is attained and the gyroscopes are held in locked position by the brake shoe, and their action is dispensed with. When this point is reached, the driving and driven shaft will have the same rotational speed.

The brake shoe 41 acting on the gyroscopic elements and actuated by centrifugal force due to rotation of the driven shaft, is of further importance when the speed of the driving and driven shafts is dropping. During such a drop in speed this brake tends to maintain a high-gear ratio between the shafts by locking the gyroscopic elements against spinning until the driven shaft speed has dropped to a low degree. When this point is reached, the conditions will be the same as at starting.

The brake means at 83 is of importance in starting the driven shaft under heavy load. The presence of this brake dispenses with the necessity of rotating the driving shaft at an excessive rate to develop the requisite gyroscopic resistance. This additional gyroscopic resistance required is supplanted by the frictional resistance resulting from pressure on the friction material 83 due to separation of the gyroscopic elements under centrifugal force. If the driven shaft cannot be started with a normally high speed of the driving shaft, a slightly higher engine speed will overcome the resistance of the spring washers 84 and bring the friction ring 83 into play which will produce enormous resistance to the spinning of the gyroscopes.

In the modification shown in Fig. 3, a double faced ring gear 55 is supported from the driven shaft 56 as by a yoke member 57 to which it is rotatably connected. The driving shaft 58 is in alignment with the driven shaft and has a yoke 59 secured to it, the arms of which have axially aligned apertures 61. Contrary to the form shown in Figs. 1 and 2, the axis of the apertures in this modification make an oblique angle with the axis of the driven shaft. A pinion shaft 62 rotatably mounted within the apertures 61 projects beyond the arms of the yoke. Affixed in any suitable manner to these projecting ends are pinion gears 63 which mesh with the separate sides of the double faced ring gear 55. A gyroscopic element 64 is secured to the pinion shaft between the yoke arms.

It will be apparent that when the driving shaft is turned and the ring gear is still, the pinions will move about the faces of the ring gear imparting a rotation to them about the axis of the pinion shaft. This will likewise cause a spinning or relative rotation of the gyroscopic element about the axis of the pinion shaft, since they are connected together. As has been pointed out in connection with the form of Figs. 1 and 2, this sets up a gyroscopic resistance in the element 64 dependent upon the speed at which it is revolved. The gyroscopic resistance, thus built up, reacts against the ring gear 55 and tends to rotate the driven shaft 56.

Mounted rotatably upon axially aligned pivot pins 65 secured at diametrically opposite points on the double-faced ring gear 55, is a governor ring 66 of larger internal diameter than that of the yokes 57 and 59. The ring 66 is provided with pinions 67 internally affixed to it and concentric with the axis of the pins 65, about which they rotate.

A brake strap 68, carrying friction material 69, is supported at its central point by a projection 71 extending within an axial bore 72 within the driven shaft. An enlarged head portion 73 at the end of this projection guides the strap in a longitudinal movement with respect to the axis of the driven shaft. The ends of the strap are slotted as at 74 to accommodate the pinions 67 and be supported by them. One side of the slots is provided with teeth forming a rack 75 meshing with the pinions 67. Rotation of the governor ring about the pivot pins 65 will cause a longitudinal motion of the brake strap through the cooperation of the pinions 67 with the racks 75, and the friction material will be brought to bear upon the gyroscopic element. To urge the brake strap to release position, a compression spring 76 is disposed between the enlarged head portion 73 and a stop 77 secured at the opening of the bore 72.

As the driven shaft beings to rotate, the governor ring, which normally maintains a position as nearly as possible parallel with the shaft, tends to assume a radial position parallel with the ring gear and in so doing brings the brake material 69 into contact with the gyroscopic element, still further resisting the rotation of this element on its own axis. This results in automatic acceleration which soon locks the entire mechanism together and produces a one-to-one gear ratio.

An oil retaining case 78 is mounted on the yoke 57 to which it may be secured and is rotatably mounted on a cylindrical portion of the yoke 59.

In Figs. 6 and 7 an embodiment of the invention is shown which is adapted for direct mounting on or against a rotatable member, whereby the device is more rigidly supported and may be accurately aligned with a desired axis. In this form of the device the bearings 90 within which the hollow sleeves 91 rotate, are mounted in bracket formations 92 of the outer casing 93. This casing is preferably formed in two cup-shaped portions 94 and 95 connecting adjacent the bracket formations as by the threaded engagement at 96. The portion 94 of the casing carrying the bracket formation may conveniently be connected to a source of power as by direct attachment to a flywheel 97.

To the outer ends of the hollow sleeves 91 are affixed the pinion gears 98, while the inner portions of the sleeves carry the gyroscopic elements 99. These gyroscopic elements have a splined connection at 101 with the hollow sleeves and are axially slidable upon the sleeves to permit separation of the elements under the action of centrifugal force. Within the hollow sleeves and co-extensive with them is a shaft 102 to maintain them in axial alignment.

The ring gear 103 with which the pinions 98 mesh, is carried by the yoke 104 connected to the portion of the driven shaft 105 which extends within the casing. Within the slots 106 formed in the arms of the yoke, and pivoted at a central point upon pin 107 carried by the yoke, is a lever 108. One end of this lever engages in the annular groove 109 formed in the brake shoe 110, for urging this shoe along the driven shaft 105, upon which it is slidably mounted, and into frictional contact with the gyroscopic elements. The other end of lever 108 projects through an opening in the lever 111 which is pivotally mounted upon pin 112 carried near the outer ends of the arms of the yoke. The free end of lever 111 is enlarged as at 113 to serve as a governor weight. Upon rotation of the driven shaft to a rate high enough to overcome the resistance of the spring 114, the governor weights will move radially outward and this movement will be transmitted to the brake shoe through the levers with a force multiplying effect.

Figure 2:
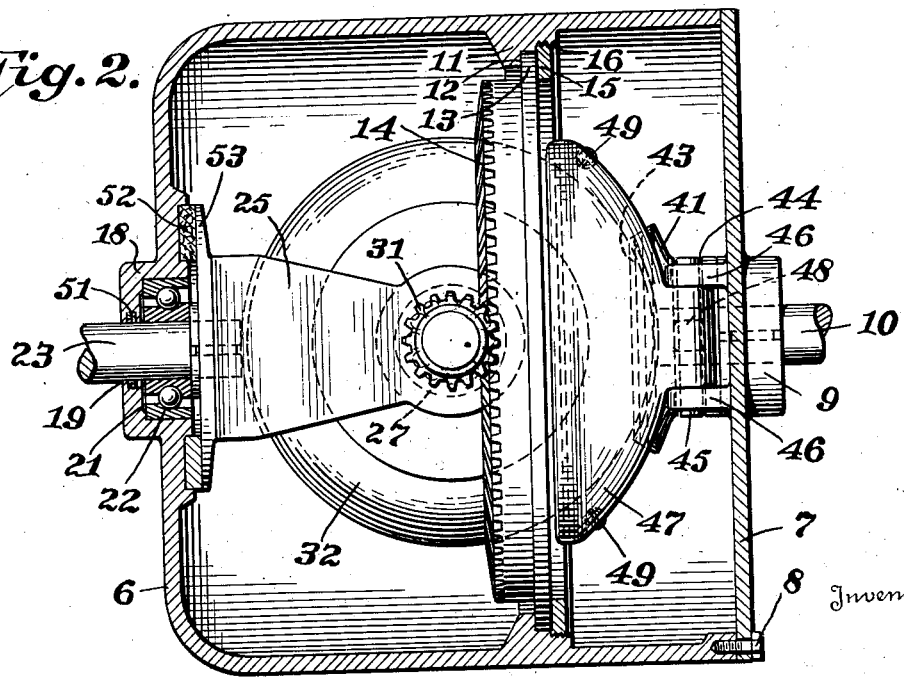
Fig. 2 is a plan view of Fig. 1 with the top of the casing broken away.

In some respects it will be noted that the device of Figs. 6 and 7 is a reversal of the device shown in Figs. 1 and 2, the former device however, possessing the additional advantages pointed out of being more adaptable to rigid mounting. Since, if the device is used in an automobile, the clutch may be eliminated, the device may be supported in the flywheel as shown and all bearings that otherwise might be required therebetween will be eliminated. Furthermore, separation of the casing in the manner shown in Fig. 6, facilitates assembly of the parts. It is to be understood, however, that the structural details present in one form of the device are not limited to the particular relationship shown, but may be substituted for equivalent structures present in other forms of the device, and are to be considered as so shown.

What is claimed is:

1. In a power transmission device, the combination of a driven gear, a gear cooperating with the driven gear and rotatable on an axis which is non-coincident with the axis of the driven gear, means for causing angular movement of the second named gear about the axis of the driven gear, a gyroscopic element connected with the second named gear to retard its relative rotation, and a frictional resistance element operative to retard the relative rotation of the second named gear.

2. A device according to claim 1 in which the frictional resistance element acts on the gyroscopic element.

3. A device according to claim 1 in which a member responsive to centrifugal force due to rotation by the device, actuates said frictional resistance element.

4. A device according to claim 1 in which the frictional resistance element is actuated by the centrifugal force exerted by the gyroscopic element.

5. In a power transmitting device, the combination of a driving shaft and a driven shaft, a gear carried by the driving shaft, said gear being rotatable on an axis which is non-coincident with the axis of the driving shaft, a gear carried by the driven shaft and cooperating with the first named gear, a gyroscopic element connected to the first named gear to retard its relative rotation, and a frictional resistance element operative to retard the relative rotation of the first named gear upon an increase in the angular velocity of one of said shafts to a predetermined degree.

6. A device according to claim 5 in which the frictional resistance element acts on the gyroscopic elements.

7. In a power transmitting device, the combination of a driving shaft and a driven shaft, a gear carried by the driving shaft, said gear being rotatable on an axis which is non-coincident with the axis of the driving shaft, a gear carried by the driven shaft and cooperating with the first named gear, a gyroscopic element connected to the first named gear to retard its relative rotation, a frictional resistance element operative to bear upon the gyroscopic element to retard the relative rotation of the first named gear, and a member associated with one of said shafts and rotated thereby to create a centrifugal force urging the frictional resistance element against the gyroscopic element.

8. A device according to claim 7 in which a spring urges the frictional resistance into inoperative position and imposes the attainment of a predetermined rotational speed of said member to overcome the spring and apply the frictional resistance.

9. In a power transmitting device, the combination of a driven gear, a gear cooperating with the driven gear and rotatable on an axis which is non-coincident with the axis of the driven gear, means for causing angular movement of the second named gear about the axis of the driven gear, a gyroscopic element connected with the second named gear to retard its relative rotation, said gyroscopic element being axially movable, and a frictional resistance element carried by the gyroscopic element and acting to retard its rotation upon axial movement of the gyroscopic element under centrifugal force.

10. In a power transmitting device the combination of a driven gear, a pair of gears cooperating with the driven gear at diametrically opposite points, said pair of gears being rotatable about an axis which is non-coincident with the axis of the drven gear, means for supporting the pair of gears and causing their angular movement about the axis of the driven gear, a pair of gyroscopic elements, each connected with one of the pair of gears to retard their relative rotation, said gyroscopic elements being located between the pair of gears and having adjacent surfaces interlocked whereby a separation of the gyroscopic elements by centrifugal action will produce frictional resistance to their relative rotation.

11. A device according to claim 10 in which resilient means resist the separation of the gyroscopic elements until a predetermined degree of angular rotation has been reached.

12. In a power transmission device, the combination of a driven gear, a gear cooperating with the driven gear and rotatable on an axis which is non-coincident with the axis of the driven gear, means for causing angular movement of the second named gear about the axis of the driven gear to retard its relative rotation, brake means operative to retard relative rotation of the gyroscopic element upon an increase in the angular velocity of the driven gear to a predetermined degree, and brake means operative to retard relative rotation of the gyroscopic element upon an increase in the angular movement of the second named gear about the axis of the driven gear to a predetermined degree.

13. In a power transmission device, the combination of a driven gear, a gear cooperating with the driven gear and rotatable on an axis which is non-coincident with the axis of the driven gear, means for causing angular movement of the second named gear about the axis of the driven gear, a gyroscopic element connected with the second named gear to retard its relative rotation, and brake means operative on the gyroscopic element upon an increase in the angular velocity of the driven gear to a predetermined degree.

14. In a power transmitting device, the combination of a driving shaft and a driven shaft, a gear carried by the driving shaft, said gear being rotatable on an axis non-coincident with the axis of the driving shaft, a gear carried by the driven shaft and cooperating with the first named gear, a gyroscopic element connected to the first named gear to retard its relative rotation, and brake means operative on the gyroscopic element upon rotation of the driven gear to a predetermined degree, said brake means including a brake shoe longitudinally movable with respect to the axis of the driven shaft, and guide means for said brake shoe associated with the driven shaft.

15. In a power transmitting device, the combination of a driving shaft and a driven shaft, a gear carried by the driving shaft, said gear being rotatable on an axis non-coincident with the axis of the driving shaft, a gear carried by the driven shaft and cooperating with the first named gear, a gyroscopic element connected to the first named gear to retard its relative rotation, and brake means operative on the gyroscopic element upon rotation of the driven gear to a predetermined degree, said brake means including a governor weight radially movable with respect to the driven shaft to move outwardly under the action of centrifugal force, a brake shoe supported by the driven shaft and movable longitudinally with respect to the axis of the driven shaft, and connecting means between the weights and the brake shoe to move the shoe into contact with the gyroscopic element upon outward movement of the weight.

16. Apparatus according to claim 15 in which a spring is provided to urge the weight and brake shoe into brake release position.

17. In a power transmitting device, the combination of a driving shaft and a driven shaft, a gear carried by the driving shaft, said gear being rotatable on an axis non-coincident with the axis of the driving shaft, a gear carried by the driven shaft and cooperating with the first named gear, a gyroscopic element connected to the first named gear to retard its relatively rotation, and brake means operative on the gyroscopic element upon rotation of the driven gear to a predetermined degree, said brake means including a governor weight, a pivotable mounting for the weight carried by the driven shaft, a brake shoe supported by the driven shaft and movable longitudinally with respect to the axis of the driven shaft, and connecting means between the weight and the brake shoe to move the shoe into contact with the gyroscopic element upon pivotal movement of the weight under the action of centrifugal force.

18. In a power transmitting device, the combination of a driving shaft and driven shaft, a gear carried by the driving shaft, said gear being rotatable on an axis non-coincident with the axis of the driving shaft, a gear carried by the driven shaft and cooperating with the first named gear, a gyroscopic element connected to the first named gear to retard its relative rotation, and brake means operative on the gyroscopic element upon rotation of the driven gear to a predetermined degree, said brake means including a governor ring pivotable about a diametrical axis, a pivotal mounting for the ring connected to the driven shaft, the axis of said pivotal mounting being radial with respect to the axis of the driven shaft, a brake shoe supported by the driven shaft and movable longitudinally with respect to the axis of the driven shaft, and connecting means between the governor ring and the brake shoe to move the shoe into contact with the gyroscopic element upon pivotal movement of the weight under the action of centrifugal force.

19. In a power transmitting device, the combination of a double faced ring gear, a pair of pinion gears, each cooperating with a separate face of the ring gear and at diametrically opposite points thereof, a pinion shaft connecting the pinion gears, means for causing angular movement of the pinion shaft about the axis of the driven gear, and a gyroscopic element mounted on the pinion shaft between the pinion gears and connected to said gears to retard their relative rotation.

20. In a power transmitting device, the combination of a driving shaft and a driven shaft, a gear carried by the driving shaft, said gear being rotatable on an axis which is non-coincident with the axis of the driving shaft, a gear carried by the driven shaft and cooperating with the first named gear, and means for retarding the relative rotation of the first named gear to effect a high-gear ratio, said means comprising a brake operative upon an increase in the angular velocity of the driving shaft to a predetermined degree, and a second brake operative upon an increase in the angular velocity of the driven shaft to a predetermined degree.

21. A power transmission device according to claim 15 in which said connecting means between the weights and the brake shoe comprises levers.

C. CLYDE PALMER.